3,755,453
PROCESS FOR THE SYNTHESIS OF ADIPOIN
(2-HYDROXYCYCLOHEXANONE)
Rudolph Rosenthal, Broomall, and Giovanni A. Bonetti, Wynnewood, Pa., assignors to Atlantic Richfield Company, New York, N.Y.
No Drawing. Filed Mar. 18, 1971, Ser. No. 125,814
Int. Cl. C07c 27/00
U.S. Cl. 260—586 R                    8 Claims

ABSTRACT OF THE DISCLOSURE

A process for preparing 2-hydroxycycloaliphatic ketones comprising reacting the corresponding cycloaliphatic ketones with an organic hydroperoxide in the presence of formic acid.

BACKGROUND OF THE INVENTION

Description of prior art

Previous methods for preparation of 2-hydroxycycloaliphatic ketones, such as adipoin, involve oxidation or dehydrogenation of the corresponding cycloaliphatic diol or hydrolysis of 2-chlorocyclohexanone with alkali carbonate or alkali acetate. The reaction of cycloaliphatic ketones and organic hydroperoxides produces hydroxy peroxides in the absence of the process of this invention.

SUMMARY OF THE INVENTION

The present invention provides a new process for preparation of 2-hydroxycycloaliphatic ketones which avoids some of the disadvantages of prior art methods of preparation. We have found that it is possible to prepare 2-hydroxycycloaliphatic ketones from the corresponding cycloaliphatic ketones by reaction with an organic hydroperoxide in the presence of formic acid as a catalyst.

DETAILED DESCRIPTION OF THE INVENTION AND THE PREFERRED EMBODIMENTS

The temperature in the reaction zone is not critical. Operable temperatures are from 0° C. to 200° C. Preferably, the temperature is from 20° C. to 105° C. The optimum temperature depends on which particular cycloaliphatic ketone and organic hydroperoxide are used and is related to other conditions of reaction.

The cycloaliphatic ketone is preferably unsubstituted, preferably has from four to twelve carbon atoms and thus can be cycloalkanones such as cyclobutanone, cyclopentanone, cyclohexanone, cycloheptanone, cyclooctanone, cyclononanone, cyclodecanone, cycloundecanone, or cyclododecanone.

The organic hydroperoxide preferably has from 4 to 12 carbon atoms and is preferably selected from the group consisting of cycloalkyl hydroperoxide, alkyl hydroperoxide, and aralkyl hydroperoxide. Exemplary organic hydroperoxides are t-butyl hydroperoxide, t-amyl hydroperoxide, cumene hydroperoxide, cyclohexyl hydroperoxide, tetralyl hydroperoxide, and ethylbenzene hydroperoxide.

The molar ratio of cycloaliphatic ketone to organic hydroperoxide is preferably about 2:1 to 1:2, and most preferably about 1:1 but may be varied between about 10:1 and 1:10.

The presence of formic acid as catalyst is critical to the process of the invention.

The reactants may be combined in any order of addition and reaction times are from a few minutes to a few hours depending upon temperature and other reaction conditions. One suitable method of combination is to add the organic hydroperoxide to a mixture of formic acid and cycloaliphatic ketone. The reaction preferably takes place in the liquid phase.

While any amount of formic acid catalyzes the reaction, it is preferred to use a molar excess of formic acid since formic acid can also act as a solvent for the reaction. The preferred molar ranges of formic acid to cycloaliphatic ketone are from 1.5:1 to 10:1.

It has been found that sulphuric acid accelerates the rate of reaction at the lower reaction temperatures. While the use of sulphuric acid is not necessary to the process of the invention, it can be present in amounts of from 0 to 0.1 parts by weight in relation to the weight of the formic acid used in order to accelerate the reaction.

The 2-hydroxycycloaliphatic ketone may be recovered by any conventional method. One suitable method is distillation of the reaction products under reduced pressure, but any method of separating 2-hydroxycycloaliphatic ketone from organic alcohol and formic acid is suitable.

The 2-hydroxycycloaliphatic ketone products of this process have varied utilities. For instance, 2-hydroxycyclohexanone is useful for the preparation of esters, for dehydration to cyclohexanone, or further oxidation to hydroxy acid or adipic acid. Other 2-hydroxycycloaliphatic ketones have known utilities.

The following examples are given to illustrate a process of the invention but are not to be construed as limiting.

EXAMPLE I

A mixture of 9.8 grams of cyclohexanone and 23 grams of formic acid was heated to 90° C. 9 grams of t-butyl hydroperoxide was added to the mixture dropwise with stirring. The reaction mixture was held between 95° C. and 100° C. for 1.5 hours and the resultant mixture was distilled under reduced pressure. Unreacted formic acid, t-butanol, and cyclohexanone were removed at 50 mm. pressure. The pressure was then reduced to about 1 mm. and 2-hydroxycyclohexanone product was removed at 50° C. and, upon standing, solidified and was dried on filter paper to remove traces of liquid impurities. Infrared and NMR analysis confirmed the product to be 2-hydroxycyclohexanone.

EXAMPLE II

Following the procedure of Example I except substituting cyclododecanone for cyclohexanone, 2-hydroxycyclododecanone may be produced in the same manner.

EXAMPLE III

Following the procedure of Example I except substituting cyclobutanone for cyclohexanone, 2-hydroxycyclobutanone may be produced in a like manner.

EXAMPLES IV to VIII

Following the same procedure as the above examples, t-amyl hydroperoxide can be substituted for t-butyl hydroperoxide and still produce the 2-hydroxycyclohexanone, 2-hydroxycyclododecanone, or 2-hydroxycyclobutanone product.

Also, cumene hydroperoxide, cyclohexyl hydroperoxide, and tetralyl hydroperoxide can be substituted in a like manner for t-butyl hydroperoxide.

While the invention has been described in detail, various modifications should become readily apparent without departing from the spirit and scope thereof.

We claim:
1. A process for preparation of 2-hydroxycycloalkanones comprising reacting at a temperature of from about 20° C. to 105° C. an organic hydroperoxide selected from the group consisting of alkyl hydroperoxides, cycloalkyl hydroperoxides and aralkyl hydroperoxides having 4 to 12 carbon atoms, and a cycloalkanone having four to twelve carbon atoms in the presence of formic acid and recovering the corresponding 2-hydroxy cycloaliphatic ketone.
2. The process of claim 1 wherein the alcohol corresponding to the organic hydroperoxide is recovered as a by-product.
3. The process of claim 1 wherein the cycloalkanone is cyclohexanone and the organic hydroperoxide is t-butylhydroperoxide.
4. The process of claim 3 wherein the product is separated by distillation.
5. The process of claim 4 conducted in the further presence of sulphuric acid.
6. The process of claim 1 wherein the molar ratio of ketone to hydroperoxide is from about 2:1 to about 1:2 and the ratio of formic acid to ketone is about 1.5:1 to 10:1.
7. The process of claim 1 wherein the cycloalkanone is cyclohexanone.
8. The process of claim 1 wherein the organic hydroperoxide is t-butyl hydroperoxide.

References Cited
UNITED STATES PATENTS

| | | | |
|---|---|---|---|
| 3,609,182 | 9/1971 | Baker | 260—586 AX |
| 2,656,390 | 10/1953 | Stoll | 260—586 A |
| 2,529,825 | 11/1950 | Stoll | 260—586 A |
| 2,228,268 | 1/1941 | Hansley | 260—586 R |
| 3,189,654 | 6/1965 | Arthur | 260—586 R |

LEON ZITVER, Primary Examiner

N. MORGENSTERN, Assistant Examiner

U.S. Cl. X.R.

260—586 A